(12) United States Patent
Vaidya et al.

(10) Patent No.: US 8,231,947 B2
(45) Date of Patent: Jul. 31, 2012

(54) OILFIELD ELEMENTS HAVING CONTROLLED SOLUBILITY AND METHODS OF USE

(75) Inventors: Nitin Y. Vaidya, Missouri City, TX (US); Rashmi Bhavsar, Houston, TX (US); Manuel Marya, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 324 days.

(21) Appl. No.: 11/427,796

(22) Filed: Jun. 30, 2006

(65) Prior Publication Data

US 2007/0107908 A1    May 17, 2007

Related U.S. Application Data

(60) Provisional application No. 60/737,439, filed on Nov. 16, 2005.

(51) Int. Cl.
 *B29D 22/00* (2006.01)
 *E21B 29/00* (2006.01)
 *E21B 33/12* (2006.01)
(52) U.S. Cl. ............... 428/34.1; 166/376; 166/192
(58) Field of Classification Search .......... 428/34.2; 166/376
 See application file for complete search history.

(56) References Cited

U.S. PATENT DOCUMENTS

| 2,261,292 A | 11/1941 | Salnikov |
| 2,779,136 A | 1/1957 | Hood et al. |
| 3,106,959 A | 10/1963 | Huitt et al. |
| 3,311,956 A * | 4/1967 | Townsend et al. ............. 164/28 |
| 3,316,748 A | 5/1967 | Lang et al. |
| 3,938,764 A | 2/1976 | McIntyre et al. |
| 4,157,732 A | 6/1979 | Fonner |
| 4,270,761 A | 6/1981 | Hertz, Jr. |
| 4,450,136 A | 5/1984 | Dudek et al. |
| 4,664,816 A | 5/1987 | Walker |
| 4,906,523 A | 3/1990 | Bilkadi et al. |
| 4,919,209 A | 4/1990 | King |
| 4,923,714 A | 5/1990 | Gibb |
| 5,188,183 A | 2/1993 | Hopmann et al. |
| 5,204,183 A | 4/1993 | McDougall et al. |

(Continued)

FOREIGN PATENT DOCUMENTS

EP    178334 A1 *   4/1986

(Continued)

OTHER PUBLICATIONS

Definition of tapered; Merriam-Webster; http://www.merriam-webster.com/dictionary/tapered; (retrieved Mar. 10, 2011).*

(Continued)

*Primary Examiner* — Rena Dye
*Assistant Examiner* — James Yager
(74) *Attorney, Agent, or Firm* — Chadwick A. Sullivan; Rodney Warfford

(57) ABSTRACT

Oilfield elements are described, one embodiment comprising a combination of a normally insoluble metal with an element selected from a second metal, a semi-metallic material, and non-metallic materials; and one or more solubility-modified high strength and/or high-toughness polymeric materials selected from polyamides, polyethers, and liquid crystal polymers. Methods of using the oilfield elements in oilfield operations are also described. This abstract allows a searcher or other reader to quickly ascertain the subject matter of the disclosure. It will not be used to interpret or limit the scope or meaning of the claims.

7 Claims, 5 Drawing Sheets

U.S. PATENT DOCUMENTS

| | | | |
|---|---|---|---|
| 5,417,285 A | 5/1995 | Van Buskirk et al. | |
| 5,479,986 A | 1/1996 | Gano et al. | |
| 5,765,641 A | 6/1998 | Shy et al. | |
| 5,826,661 A | 10/1998 | Parker et al. | |
| 6,155,348 A | 12/2000 | Todd | |
| 6,162,766 A | 12/2000 | Muir et al. | |
| 6,209,646 B1 | 4/2001 | Reddy et al. | |
| 6,241,021 B1 | 6/2001 | Bowling | |
| 6,261,432 B1 | 7/2001 | Huber et al. | |
| 6,311,773 B1 | 11/2001 | Todd et al. | |
| 6,346,315 B1 | 2/2002 | Sawatsky | |
| 6,422,314 B1 | 7/2002 | Todd et al. | |
| 6,444,316 B1 | 9/2002 | Reddy et al. | |
| 6,457,525 B1 | 10/2002 | Scott | |
| 6,494,263 B2 | 12/2002 | Todd | |
| 6,527,051 B1 | 3/2003 | Reddy et al. | |
| 6,554,071 B1 | 4/2003 | Reddy et al. | |
| 6,561,270 B1 | 5/2003 | Budde | |
| 6,607,036 B2 * | 8/2003 | Ranson et al. | 166/302 |
| 6,632,527 B1 * | 10/2003 | McDaniel et al. | 428/402 |
| 6,737,385 B2 | 5/2004 | Todd et al. | |
| 6,745,159 B1 | 6/2004 | Todd et al. | |
| 6,854,522 B2 | 2/2005 | Brezinski et al. | |
| 6,866,306 B2 | 3/2005 | Boyle et al. | |
| 6,877,563 B2 | 4/2005 | Todd et al. | |
| 6,896,058 B2 | 5/2005 | Munoz, Jr. et al. | |
| 6,918,445 B2 | 7/2005 | Todd et al. | |
| 6,924,254 B2 | 8/2005 | Todd | |
| 6,968,898 B2 | 11/2005 | Todd et al. | |
| 6,971,448 B2 | 12/2005 | Slabaugh et al. | |
| 6,976,538 B2 | 12/2005 | Wilson et al. | |
| 6,983,798 B2 | 1/2006 | Todd | |
| 7,000,701 B2 | 2/2006 | Todd et al. | |
| 7,021,383 B2 | 4/2006 | Todd et al. | |
| 7,036,586 B2 | 5/2006 | Roddy et al. | |
| 7,036,588 B2 | 5/2006 | Munoz, Jr. et al. | |
| 7,036,687 B1 | 5/2006 | Lowe | |
| 7,044,220 B2 | 5/2006 | Nguyen et al. | |
| 7,285,772 B2 | 10/2007 | Labous et al. | |
| 7,322,412 B2 | 1/2008 | Badalamenti et al. | |
| 7,322,417 B2 | 1/2008 | Rytlewski et al. | |
| 7,353,867 B2 | 4/2008 | Carter et al. | |
| 2003/0116608 A1 | 6/2003 | Litwinski | |
| 2003/0150614 A1 | 8/2003 | Brown et al. | |
| 2003/0224165 A1 | 12/2003 | Anderson | |
| 2004/0043906 A1 * | 3/2004 | Heath et al. | 507/200 |
| 2004/0188090 A1 * | 9/2004 | Vaeth et al. | 166/286 |
| 2005/0145381 A1 | 7/2005 | Pollard | |
| 2005/0161222 A1 | 7/2005 | Haugen et al. | |
| 2005/0173126 A1 | 8/2005 | Starr et al. | |
| 2005/0194141 A1 | 9/2005 | Sinclair | |
| 2005/0205264 A1 | 9/2005 | Starr et al. | |
| 2005/0205265 A1 | 9/2005 | Todd et al. | |
| 2005/0205266 A1 | 9/2005 | Todd et al. | |
| 2005/0241824 A1 | 11/2005 | Burris, II et al. | |
| 2005/0241835 A1 | 11/2005 | Burris, II et al. | |
| 2005/0269083 A1 | 12/2005 | Burris, II et al. | |
| 2006/0027359 A1 | 2/2006 | Carter et al. | |
| 2006/0035074 A1 | 2/2006 | Taylor | |
| 2006/0037759 A1 | 2/2006 | Braddick | |
| 2006/0042835 A1 | 3/2006 | Guerrero et al. | |
| 2006/0175059 A1 | 8/2006 | Sinclair et al. | |
| 2006/0207771 A1 | 9/2006 | Rios, III et al. | |
| 2006/0249310 A1 | 11/2006 | Stowe et al. | |
| 2006/0266551 A1 | 11/2006 | Yang et al. | |
| 2007/0034384 A1 | 2/2007 | Pratt | |
| 2007/0181224 A1 | 8/2007 | Marya et al. | |
| 2008/0018230 A1 | 1/2008 | Yamada et al. | |
| 2008/0079485 A1 | 4/2008 | Taipale et al. | |
| 2008/0105438 A1 | 5/2008 | Jordan et al. | |
| 2008/0149345 A1 | 6/2008 | Marya et al. | |
| 2008/0149351 A1 | 6/2008 | Marya et al. | |

FOREIGN PATENT DOCUMENTS

| | | |
|---|---|---|
| EP | 1605281 A1 | 12/2005 |
| EP | 1605281 B1 | 12/2005 |
| GB | 666281 A | 2/1952 |
| GB | 1187305 A | 4/1970 |
| GB | 2386627 A | 9/2003 |
| JP | 11264042 A | 9/1999 |
| JP | 2002161325 A | 6/2002 |
| RU | 2073696 C1 | 2/1997 |
| WO | 0248503 A1 | 6/2002 |
| WO | 2005090742 A1 | 11/2005 |
| WO | 2006023172 A2 | 3/2006 |
| WO | 2008079485 A2 | 7/2008 |

OTHER PUBLICATIONS

D. W. Thomson, Design and Installatin of a Cost-Effective Completion System for Horizontal Chalk Wells Where Multiple Zones Require Acid Stimulation, SPE Drilling & Completion, Sep. 1998, pp. 151-156.

www.answers.com/topic/degrade:date and author unknown.

* cited by examiner

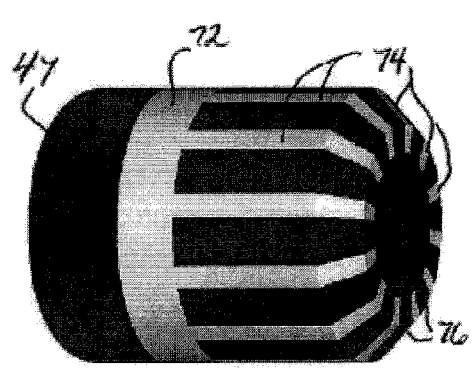
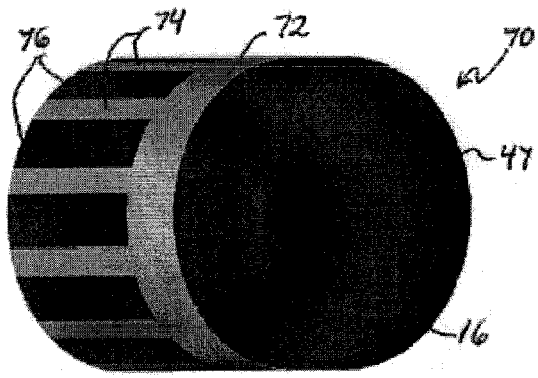
FIG. 5A    FIG. 5B
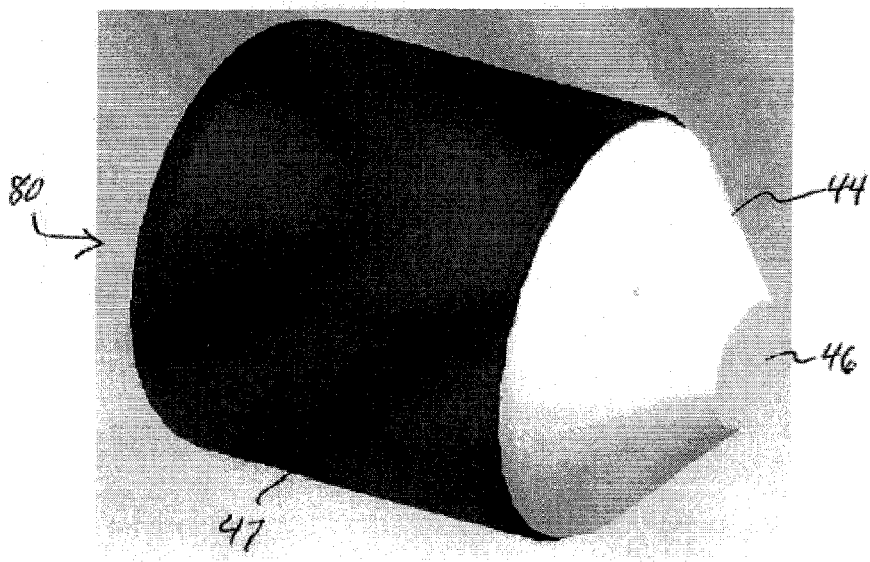
FIG. 6

OILFIELD ELEMENTS HAVING CONTROLLED SOLUBILITY AND METHODS OF USE

CROSS-REFERENCE TO RELATED APPLICATIONS

The present application claims priority under 35 U.S.C. §119(e) to U.S. Provisional Application Ser. No. 60/737,439, filed Nov. 16, 2005, incorporated by reference herein in its entirety.

BACKGROUND OF THE INVENTION

1. Field of Invention

The present invention relates generally to the field of oilfield exploration, production, and testing, and more specifically to a material and soluble oilfield elements such as well operating elements and methods of using same, which exhibit a combination of rapid solubility and high strength and/or high toughness. This invention also relates to and altering the solubility of above mentioned high strength soluble oilfield elements and well operating elements.

2. Related Art

A diverter ball is a ball that is dropped or pumped through wellbore tubulars in a process known as diversion, and used during acidizing and fracturing operations. One common method of fracturing wells is to have a multitude of perforations open in the well that are exposed to the fracturing pressure being pumped into the well bore. The formation will begin to fracture behind a few of the perforations and the majority of the fracturing fluid will flow through these few perforations. Typically, initiating fractures requires more pressure than continuing an existing fracture so diverter balls are used to divert flow to other perforations. A percentage of diverter balls compared to the total number of perforations are dropped in a well (as an example, 10 balls are dropped at a time in a well with 100 perforations) and the balls theoretically will plug off the perforations which are taking the majority of flow because the flow is carrying the balls. Once the diverter balls are plugging the flowing perforations, the well bore pressure will increase until new fractures are started behind other perforations. More diverter balls are dropped until the majority of all of the perforated intervals are fractured. In other well operations, balls are used that function to open and close downhole valves in different fracturing zones, and may serve as temporary plugs to zones below the ball. In this sense the term balls includes bars, plugs, darts, and other shaped members, and are more generally referred to herein as well operating elements.

Diverter balls and fracturing elements are typically flowed to the surface or dropped to the bottom of the wellbore when their use is completed. If they are not degradable in the wellbore environment, there is a disincentive to their use. Dissolvable diverter balls are known in diversion operations, however, during use their strength and durability is not always considered. In a diversion process, a ball, dart, or other non-dissolvable fracturing element may land on a seat and be positioned effectively to divert fracturing fluid, acids, and/or proppants outwardly through crossover ports for flow through the annulus into the formation adjacent a perforated casing section. However, if these non-dissolvable fracturing elements are composed of non-engineered materials, they may dissolve and/or degrade in a shorter time period than desired or anticipated by the well operating personnel. Multiple small dissolvable diverter balls are then flowed in to the tubing, typically with the fracturing fluid, and seat on perforations in the casing to divert fracturing fluids, acids, and proppants from a high flow area of perforations to a low flow area so that the low flow area receives the treatment fluid. While eventually the dissolvable diverter ball material degrades, from mechanical action, contact with a fluid, heat, or combination thereof, it would be desirable if before the dissolvable material degrades that the materials remain tough and strong to perform their function, and not degrade prematurely.

It would be desirable in many well operations to have oilfield elements that are durable when required to be, but that also dissolve (or include a portion that dissolves) in an aqueous wellbore environment, without having to resort to highly acid conditions, high temperatures, and mechanical milling. None of the known drop balls, diverter balls, valve elements and other known oilfield elements and tools have both the ability to perform functions requiring high strength and durability during their intended use, but also have the ability to dissolve when desired in aqueous environments, and there is a need in the art for such items.

The effect of addition of hydrophilic groups into polymers has been reported before, for example in *Journal of Applied Polymer Science*, Vol. 99, 756-774 (2006), Wiley Periodicals; and *Journal of Materials Science*, Vol. 40, 629-636 (2005); as well as in the following published patent documents: WO2005090742; US20050205266; US 20050205265; US20050205264; US20050173126. Published U.S. patent application Ser. No. 20050205265 lists the following polymers for downhole applications: degradable polymers selected from the group consisting of polysaccharides, chitins, chitosans, proteins, aliphatic polyesters, poly(lactides), poly(glycolides), poly(.epsilon.-carprolactones), poly(hydroxybutyrates), poly(anhydrides), aliphatic polycarbonates, poly(orthoesters), poly(amino acids), poly(ethylene oxides), polyphoshazenes, and mixtures thereof. The main drawback of these materials listed is that they do not dissolve rapidly enough. For example, polylactic acid (PLA) grade 3051D does exhibit very good tensile strength but shows almost negligible degradation/dissolution within 48 hrs at 220° F. (104° C.) in 4% sodium chloride brine.

SUMMARY OF THE INVENTION

In accordance with the present invention, oilfield elements (including, but not limited to, well operating elements) and methods of using same are described that reduce or overcome problems in previously known apparatus and methods. Apparatus of the invention incorporate materials which exhibit properties of good strength and/or toughness combined with very high solubility in water based fluids typically encountered in downhole conditions. One class of oilfield elements useful in the inventive apparatus comprises a composition comprising a combination of a normally insoluble metal or alloy with one or more elements selected from a second metal or alloy (e.g., a compacted powder blend of magnesium with a stainless steel), a semi-metallic material (e.g., a sintered blend of powders of magnesium with silicon or carbon, e.g., graphite), and a non-metallic material (e.g. an acid producing polymer, or a metal-based soluble ionic compound such as alkaline and alkaline earth oxides, carbonates, sulfides, and the like).

A second class of oilfield elements of the invention comprise a composition comprising one or more solubility-modified versions of high-strength and/or high-toughness polymeric materials with high solubility, which are selected from aromatic polyamides, polyethers, and liquid crystal polymers. As used herein the term "solubility-modified" means that the high-strength and/or high-toughness polymeric materials are normally insoluble in aqueous conditions, but are chemically, physically, and/or mechanically modified to be soluble in aqueous conditions. As used herein the term "aqueous conditions" includes not only water but water-based liquids, and includes mildly acidic and mildly alkaline conditions (pH ranging from about 5 to about 9), although this range is very general, and in particular sections of a wellbore the pH may be less than 5 or greater than 9 at any given moment in time. Oilfield elements of the invention may be useful for any of a multitude of purposes, including, but not limited to, opening completion valves and sealing off lower layers during fracturing operations.

A first aspect of the invention are oilfield elements (which may be well operating elements) comprising materials selected from:
  a) a combination of a normally insoluble metal or alloy with one or more elements selected from a second metal or alloy, a semi-metallic material, and non-metallic materials; and
  b) one or more solubility-modified high-strength and/or high-toughness polymeric materials selected from aromatic polyamides, polyethers, and liquid crystal polymers.

As used herein the term "normally insoluble" means the metal does not substantially or significantly degrade or deteriorate, whether by oxidation, hydrogen embrittlement, galvanic corrosion or other mechanism, in the time frame during which the oilfield element is asked to perform its duty. As used herein the term "high-strength and/or high-toughness" means simply that the solubility-modified polymer has physical strength to survive running in the wellbore and performing its intended function, such as plugging a perforation, opening or closing a valve, and the like. In other words it depends on the particular function the oilfield element will be asked to perform. To plug a perforation may require a higher degree of strength, for a longer time, than the function of opening or closing a valve. Therefore, while hard to delimit, either the tensile strength may be no less than about 4000 psi (28 mPa), or minimum strain energy per unit volume of at least 2,500 in-lb/in$^3$ (17 joules/cm$^3$) under ambient conditions. The normally insoluble metal and the bulk of the solubility-modified high strength and/or high-toughness toughness polymeric material function in the respective compositions to provide strength and durability when the oilfield elements are used for their intended purpose, and not exposed to aqueous conditions. Oilfield elements of the invention may be designed to distribute loads at high stress areas, such as at a ball seat. Also, oilfield elements of the invention may be capable of a wider temperature characteristic compared to previously known oilfield elements such that they are not subject to excessive degradation at extreme temperatures by comparison. Oilfield elements of the invention may be structured in many ways to control their degradation under aqueous conditions, if desired. For example, a normally insoluble metal may comprise a coating, covering, or sheath upon a portion of or an entire outer surface of an oilfield element, or the normally insoluble metal may be embedded into a mass of the one or more elements selected from a second metal or alloy, a semi-metallic material, and non-metallic materials (and more water-soluble) phase. Alternatively, oilfield elements of the invention may be structured so that the chemically, physically and/or mechanically modified portions of the solubility-modified high-strength and/or high-toughness polymeric materials may be sequestered away from contacting water or water-based fluids. In addition the solubility-modified high-strength and/or high-toughness polymers may include acidic ingredients, alkaline ingredients, fillers, mechanical reinforcing materials, and the like, in order to alter the rate of dissolution and/or alter mechanical properties of the inventive oilfield elements based on modified polymeric materials. The solubility-modified high-strength and/or high-toughness polymeric materials may comprise blends of two or more solubility-modified high-strength and/or high-toughness polymers, and blends of one or more solubility-modified high-strength and/or high-toughness polymers and one or more other polymers unlimited in type (thermoset, and non-thermoset polymeric materials). The solubility modified high strength and/or high-toughness polymeric materials may also contain blends of one or more solubility-modified high strength polymers and nonpolymeric hydrophilic materials, such as fumed silica, functionalized fillers such as carboxyl functionalized carbon nanotubes, hydrophilic nanoclays, and the like, as well as soluble and/or reactive metals. The rate of solubility of the solubility-modified high strength and/or high-toughness polymeric material may be modified by blending the solubility-modified high strength and/or high-toughness polymeric material with a high barrier property filler, for example nanoclays like bentonite, expanded graphite, and other high aspect ratio platy fillers such as mica and talc. Layered versions of compositions are considered useful and within the invention, wherein individual layers may be the same or different in composition and thickness. The term "polymeric material" includes composite polymeric materials, such as, but not limited to, polymeric materials having fillers, plasticizers, and fibers therein. Suitable synthetic polymeric materials include those selected from thermoset polymers and non-thermoset polymers. Examples of suitable non-thermoset polymers include thermoplastic polymers, such as polyolefins, polytetrafluoroethylene, polychlorotrifluoroethylene, and thermoplastic elastomers.

Oilfield elements of the invention may have a number of shapes, as long as the element is able to perform its intended function when not exposed to aqueous conditions, for example traverse at least a portion of a wellbore and block off a perforation, or a portion of a wellbore as a wellbore plug, or to actuate (open or close) a downhole valve. Suitable well operating oilfield element shapes include cylindrical, round, bar shapes, dart shapes and the like. A dart shape means that the bottom has a tapered end, in some cases pointed. Well operating oilfield elements of the invention will generally have first and second ends that may be tapered in shape to contribute to the ease of the element traversing through a wellbore.

Another aspect of the invention are methods of using an oilfield element of the invention in performing an oilfield operation, such as fracturing and acidizing, one method comprising:
  (a) selecting an oilfield element of the invention depending on the environmental and operating conditions expected during the intended use of the oilfield element; and
  (b) using the oilfield element in an oilfield operation in the environmental and operating conditions.

Methods of the invention may include, but are not limited to, running one or more sensors into a wellbore using one or more surface oilfield elements in order to determine the environmental and/or operating conditions of the wellbore at least where the oilfield element is to be positioned. The environmental and/or operating conditions of the wellbore during running and retrieving may be the same or different from the environmental and/or operating conditions during use in the wellbore or at the surface. The oilfield elements of the invention may be used as replacement for so-called bioballs, which are currently used to plug perforations. The previously known dissolvable materials do not completely dissolve and rapidly loose their strength.

The various aspects of the invention will become more apparent upon review of the brief description of the drawing figures, the drawing figures themselves, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 2-6 and 9 are schematic perspective views of other embodiments of well operating elements in accordance with the invention.

Figure 1:
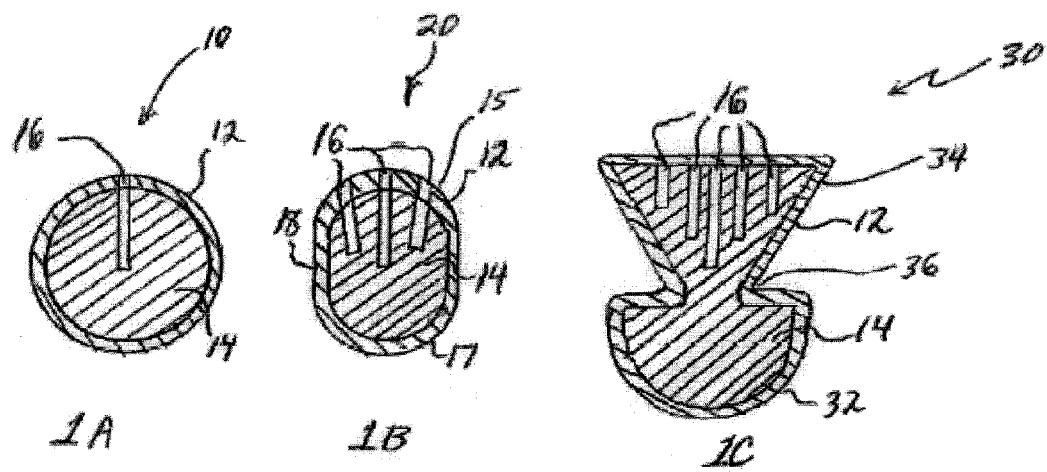
FIGS. 1, 7, and 8 are diagrammatical cross-sectional views of various exemplary well operating elements of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

The invention describes oilfield elements useful in oilfield applications, including exploration, drilling, and production activities. As used herein the term "oilfield" includes land based (surface and sub-surface) and sub-seabed applications, and in certain instances seawater applications, such as when exploration, drilling, or production equipment is deployed through seawater. The term "oilfield" as used herein includes hydrocarbon oil and gas reservoirs, and formations or portions of formations where hydrocarbon oil and gas are expected but may ultimately only contain water, brine, or some other composition.

An "oilfield element" includes, but is not limited to one or more items or assemblies selected from tubing, blow out preventers, sucker rods, O-rings, T-rings, jointed pipe, electric submersible pumps, packers, centralizers, hangers, plugs, plug catchers, check valves, universal valves, spotting valves, differential valves, circulation valves, equalizing valves, safety valves, fluid flow control valves, connectors, disconnect tools, downhole filters, motorheads, retrieval and fishing tools, bottom hole assemblies, seal assemblies, snap latch assemblies, anchor latch assemblies, shear-type anchor latch assemblies, no-go locators, and the like.

A "well operating element" is an oilfield element that is useful in a well operation. Well operations include, but are not limited to, well stimulation operations, such as hydraulic fracturing, acidizing, acid fracturing, fracture acidizing, or any other well treatment, whether or not performed to restore or enhance the productivity of a well. Stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

Hydraulic fracturing, in the context of well workover and intervention operations, is a stimulation treatment routinely performed on oil and gas wells in low-permeability reservoirs. Specially engineered fluids are pumped at high pressure and rate into the reservoir interval to be treated, causing a vertical fracture to open. The wings of the fracture extend away from the wellbore in opposing directions according to the natural stresses within the formation. Proppant, such as grains of sand of a particular size, is mixed with the treatment fluid keep the fracture open when the treatment is complete. Hydraulic fracturing creates high-conductivity communication with a large area of formation and bypasses any damage that may exist in the near-wellbore area.

In the context of well testing, hydraulic fracturing means the process of pumping into a closed wellbore with powerful hydraulic pumps to create enough downhole pressure to crack or fracture the formation. This allows injection of proppant into the formation, thereby creating a plane of high-permeability sand through which fluids can flow. The proppant remains in place once the hydraulic pressure is removed and therefore props open the fracture and enhances flow into the wellbore.

Acidizing means the pumping of acid into the wellbore to remove near-well formation damage and other damaging substances. This procedure commonly enhances production by increasing the effective well radius. When performed at pressures above the pressure required to fracture the formation, the procedure is often referred to as acid fracturing. Fracture acidizing is a procedure for production enhancement, in which acid, usually hydrochloric (HCl), is injected into a carbonate formation at a pressure above the formation-fracturing pressure. Flowing acid tends to etch the fracture faces in a non-uniform pattern, forming conductive channels that remain open without a propping agent after the fracture closes. The length of the etched fracture limits the effectiveness of an acid-fracture treatment. The fracture length depends on acid leakoff and acid spending. If acid fluid-loss characteristics are poor, excessive leakoff will terminate fracture extension. Similarly, if the acid spends too rapidly, the etched portion of the fracture will be too short. The major problem in fracture acidizing is the development of wormholes in the fracture face; these wormholes increase the reactive surface area and cause excessive leakoff and rapid spending of the acid. To some extent, this problem can be overcome by using inert fluid-loss additives to bridge wormholes or by using viscosified acids. Fracture acidizing is also called acid fracturing or acid-fracture treatment.

A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

The first class of materials useful in forming oilfield elements of the invention comprises a combination of normally insoluble metal or alloys with metallurgically-soluble (partially/wholly) and/or blendable elements selected from other metals or alloys, semi-metallic elements, and/or non-metallic elements; thus new compositions to form new complex alloys and composite structures of poor stability in the designated fluid environment. Examples of metals preferentially selected to develop high strength include iron, titanium, copper, combinations of these, and the like, among other metals. Second metals, semi-metallic elements, and non-metallic elements useful in the invention are any metal, semi-metallic element, or non-metallic element that will form a non-durable (degradable) composition with the first element. Examples include metals such as gallium, indium, tin, antimony, combinations of these, and the like; semi-metallic elements such as carboxylated carbon (e.g. in graphitic or nanotube form), and organic compounds such as sulfonated polystyrene, styrene sulfonic acid, and compositions comprising non-metallic materials such as oxides (anhydride), carbonates, sulfides, chlorides, bromides, acid-producing or basic producing polymers, or in general fluid pH changing polymers. Many of these non-metallic materials may contain metals that are chemically-bonded to non-metallic elements (wherein the bonds may be ionic, covalent, or any degree thereof). These materials include, but are not limited to, alkaline and alkaline-earth oxides, sulfides, chlorides, bromides, and the like. These materials, alone, are at least partially water-soluble and, when properly combined (e.g. blended) with normally insoluble metals and alloys, will degrade the chemical resistance of the normally insoluble metals by changing the designated fluid chemistry, including its corrosiveness, thus creating galvanic cells, among other possible mechanisms of degradations. Examples of normally insoluble metals and alloys made soluble through the additions of elements, including polymers, that would directly destabilize the metallic state of the normally insoluble element for a soluble ionic state (e.g. galvanic corrosion, lower pH created by acid-polymers), or indirectly by promoting ionic compounds such as hydroxides, known to predictably dissolve in the designated fluid environment. Also included in the invention are exothermic reactions occurring in fluid such as water that may act as trigger to the degradation of one of the composition. The ratio of normally insoluble metal to metallurgically soluble or blendable elements is dependent on the end use of the oilfield element, the pressure, temperature, and element lifetime requirements as well as the fluid environment compositions, and, without limiting the applications, may range from 4:1 to 1:1 for instance.

The second class of materials useful in the invention includes one or more solubility-modified high strength and/or high-toughness polymeric materials that may be selected from polyamides (including but not limited to aromatic polyamides), polyethers, and liquid crystal polymers. As used herein, the term "polyamide" denotes a macromolecule containing a plurality of amide groups, i.e., groups of the formula —NH—C(═O)— and/or —C(═O)—NH—. Polyamides as a class of polymer are well known in the chemical arts, and are commonly prepared via a condensation polymerization process whereby diamines are reacted with dicarboxylic acid (diacids). Copolymers of polyamides and polyethers may also be used, and may be prepared by reacting diamines with diacids.

Aromatic polyamides useful in the invention include those generically known as aramids. Aramids are highly aromatic polyamides characterized by their flame retardant properties and high strength. They have been used in protective clothing, dust-filter bags, tire cord, and bullet-resistant structures. They may be derived from reaction of aromatic diamines, such as para- and/or meta-phenylenediamine, and a second monomer, such as terephthaloyl chloride.

Polyethers as a class of polymer are also well known, where one type of polyether is commonly prepared by reaction of an alkylene oxide (e.g., ethylene oxide) with an initiating group (e.g., methanol). The term "polyether" as used herein denotes a macromolecule containing a plurality of ether groups, i.e., groups of the formula R—O—R where R represents an organic (carbon-containing) group. At present, many polyethers are commercially available that have terminating groups selected from amine, hydroxyl and carboxylic acid. Polyethers having two amine terminating groups may be used according to U.S. Pat. No. 6,956,099, incorporated herein by reference, to introduce polyether blocks into a polyamide copolymer. This approach provides blocks of polyether groups within a polyamide copolymer.

As noted in U.S. Pat. No. 5,057,600, incorporated herein by reference, "poly(etheretherketone)" or "PEEK" refers to a polymeric material which comprises poly(etheretherketone), i.e., [poly(oxy-p-phenyleneoxy-p-phenylenecarbonyl-p-phenylene]. PEEK is a widely available semi-crystalline or amorphous high performance thermoplastic polymeric material. PEEK is soluble in only a few solvents. Some of the solvents require high temperatures while other solvents such as sulfuric acid, sulfonate the PEEK molecules, which alters the polymer and complicates characterization. Solution properties of PEEK have been studied by Berk, C. and Berry, G. C., *J. Polym. Sci.: Part B: Polym. Phys.*, 28, 1873 (1990); Bishop et al., *Macromolecules*, 18, 86 (1985); Roovers et al., *Macromolecules*, 26, 3826 (1993); and Roovers, et al., *Macromolecules*, 23, 1611 (1990).

Other similar polymeric (PEEK-type polymers) materials such as poly(aryletherketone) (PAEK), poly(etherketone) (PEK), or poly(etherketoneketone) (PEKK), may also be polymers within this invention. Further, poly(etheretheretherketone) (PEEEK), poly(etheretherketoneetherketone) (PEEKEK), poly(etheretherketoneketone) (PEEKK), poly etherketoneetherketoneketone) (PEKEKK) are also to be considered as PEEK-type polymers, both individually and as mixtures and as copolymers with each other. Polymer mixtures of these PEEK-type polymers with poly(phenylene sulfide) or "PPS" are also contemplated within the present invention.

"PEEK-type" refers to poly(etheretherketone)-like polymers, poly(phenylenesulfide)-type polymers or mixtures or copolymers of these amorphous polymers within the present invention.

"Phenyl" or "phenylene" refers to the following structures:

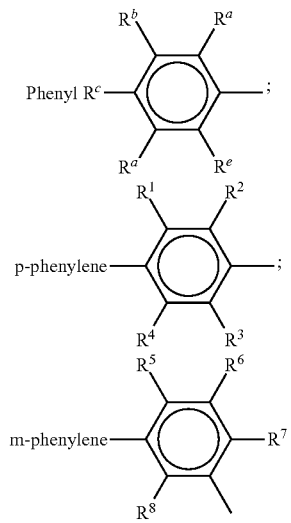

wherein $R^a$, $R^b$, $R^c$, $R^d$, $R^e$ and $R^1$ to $R^8$, inclusive, are each independently selected from hydrogen, methyl, ethyl, propyl, butyl, fluorine, chlorine or bromine.

These structures may be found as part of the PEEK-like, PEEK-type, PPS, PPS-like, and PPS-type polymer structures described herein. Thus, a poly(phenylene sulfide)-type structure may have as a structure poly(2-chlorophenylene sulfide) or poly (2-methylphenylene sulfide). Also, a PEEK-type structure may include [poly (oxy-p-(2-chlorophenyleneoxy)-p-(2-methylphenylene-carbonyl)-p-phenylene)]. The p-phenylenes having at least two groups of $R^1$ to $R^4$ being hydrogen may be used, with the other two groups each independently selected from methyl, ethyl, propyl, butyl, fluorine, chlorine or bromine. The p-phenylenes wherein three of the groups $R^1$ and $R^4$ are hydrogen and the remaining group is independently selected from methyl, ethyl, propyl, butyl, fluorine, chlorine or bromine may also be useful.

Liquid crystal polymers (e.g. lyotropic liquid crystal polymers and thermotropic liquid crystal polymers) having one or more mesogen groups in a main chain or a side chain useful in the invention include those polymers whose molecules have a tendency to align themselves and remain in that alignment. They comprise a diverse family although most are based on polyesters and polyamides. In their molecular structure, LCPs do not fit into the conventional polymer categories of amorphous and semi-crystalline, displaying a high degree of crystallinity in the melt phase, hence 'liquid crystal'. LCPs are essentially composed of long, rod-like molecules that align themselves in the direction of material flow. This alignment is maintained as solidification takes place, hence they are referred to as 'self reinforcing'. However, this does lead to anisotropic properties. Despite offering the best high temperature and fire resistance properties of all the thermoplastics, with certain grades able to operate at temperatures around 300° C., LCPs are relatively easy to process, although the higher the temperature resistance the more difficult may be their processing. The crystalline nature imparts excellent resistance to solvents, industrial chemicals, and UV and ionizing radiations. They may be more expensive than other polymers, and, apart from dual use (conventional and microwave oven) cookware, production volumes are anticipated to be low. Further uses of LCPs have been envisaged in electronic and automotive markets, replacing die cast and machined metal parts as well as thermosets.

As the liquid crystal polymer, there can be used those having one or more mesogen groups in a main chain or a side chain and which are normally, before being solubility-modified, able to be dissolved in an organic solvent. Examples of liquid crystal polymers having one or more mesogen groups in the main chain, as disclosed in U.S. Pat. No. 5,067,797, incorporated by reference herein, are aromatic polyamides such as poly (p-phenyleneterephtharamide) (commercially available by a trade name of Kevlar, from E.I. du Pont de Nemours and Co.), poly(p-benzamide), and the like; cellulose derivatives such as hydroxypropyl cellulose, and the like; polypeptides such as poly(Y-benzyl-L-glutamate), and the like; block polymers such as styrene-ethylene oxide block polymer, and the like; poly(p-phenylenebenzobisthiazole), polyterephthaloylhydrazide, and the like. These polymers are used as polymers showing lyotropic liquid crystal properties.

As the main chain type liquid crystal polymers showing thermotropic liquid crystal properties, one class that may be used are polyester series liquid crystal polymers. For example, a copolymer of polyethylene terephthalate and p-hydroxybenzoic acid shows liquid crystal properties in a wide range of composition and may be dissolved in chloroform, a mixed solvent of phenol/tetrachloroethane, and the like. Therefore, such a polymer may be used in the water surface spreading film-forming method. Other examples of polyesters are represented by the formulae:

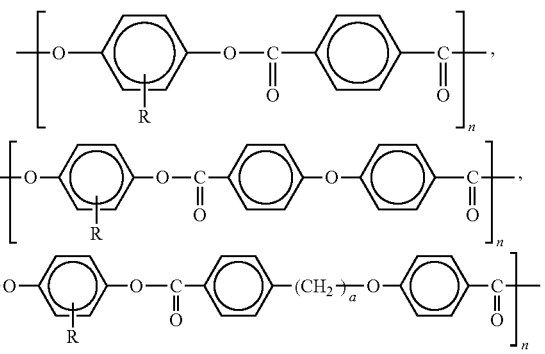

where R is —$CH_3$, —Cl or

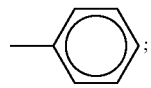

wherein n is an integer of preferably 10 to 50; and a is an integer of preferably 2 to 5. It is also possible to use a polyazo (xy)phenol alkanoate represented by the formula:

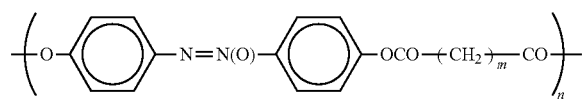

wherein m is an integer of preferably 2 to 5; and n is as defined above.

Polyamides represented by the formula:

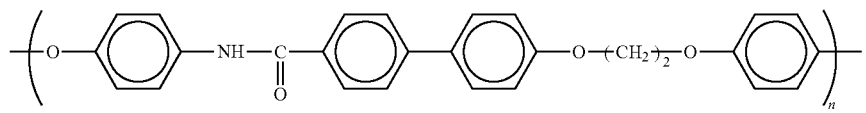

wherein n and a are as defined above, may be used as materials showing thermotropic properties.

Polyazomethine of the formula:

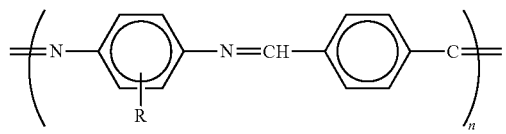

wherein R and n are as defined above, may also be used.

As the mesogen groups used in the above-mentioned side chain type liquid crystal, there can be used almost compounds usable as low molecular weight liquid crystal compounds.

Examples of the skeleton chain of the side chain type liquid crystal polymers are polystyrene, polyacrylate, polymethacrylate, polysiloxane, and polymalonate. For example, in the case of having polyacrylate as the skeleton chain, the side chain type liquid crystal polymer is represented by the formula:

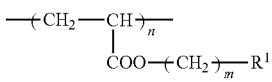

wherein $R^1$ is

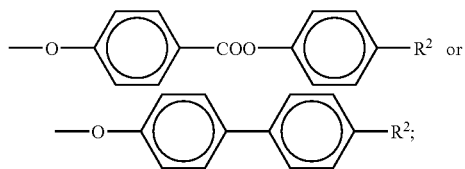

R is —CN or —O—(—CH$_2$—)$_a$—CH$_3$; and a may range from 0 to 8. More concretely, the following side chains may be used:

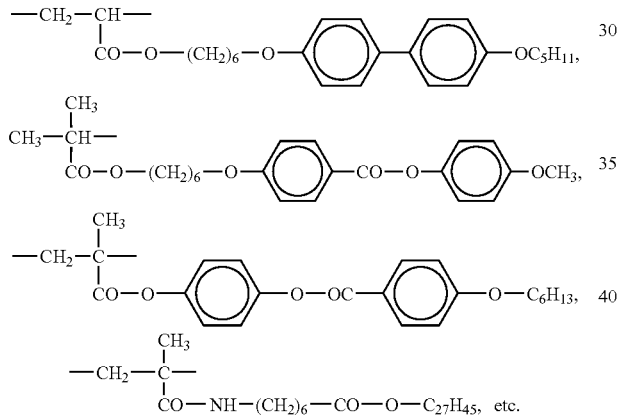

The above-mentioned liquid crystal polymers may be used alone, or used by copolymerization with other monomers or blending with other polymers. It is possible to mix with one or more non-liquid crystal polymers, so long as the effect of the present invention is not reduced.

In forming liquid crystal polymeric materials, one method is to form films on a surface of water, and build up layers into shaped forms, such as for oilfield elements of the invention. The organic solvent for uniformly spreading the above-mentioned liquid crystal polymers on a water surface for film-formation can be selected depending on the material used. Generally speaking, liquid crystal polymers (particularly those showing thermotropic liquid crystal properties) are poor in solubility prior to being modified for water-solubility as discussed herein. In the case of aromatic polyamides, the solubility can be improved by copolymerization with a bridged biphenylene type compound (e.g. 3,8-diaminophenanthridinone). Typical examples of the solvent for spreading are N,N-dimethylacetamide, and N-methylpyrrolidone for particularly aromatic polyamides. If necessary, it is effective to add a salt such as LiCl, CaCl$_2$, and the like.

Phenolic solvents such as phenol, p-chlorophenol, and the like, are effective for spreading, for example, polyester type liquid crystal polymers on the water surface.

Other liquid crystal polymers that may be used include nematic liquid crystals represented by the formulae (1) to (7), ferroelectric liquid crystals represented by the formulae (8) to (12), and mixtures of liquid crystals conventionally used:

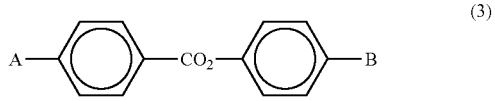

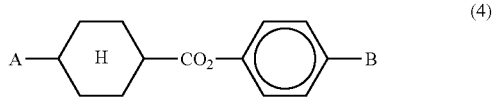

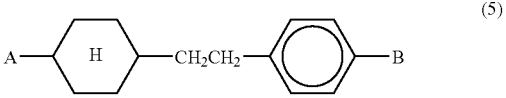

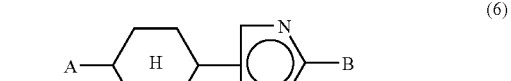

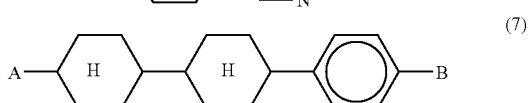

wherein A and B are independently an alkyl group, an alkoxy group, or cyano group, or an fluorine atom.

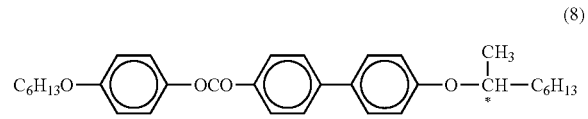

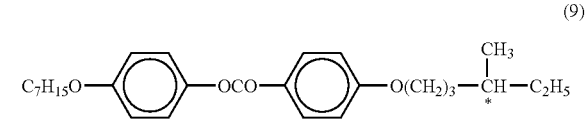

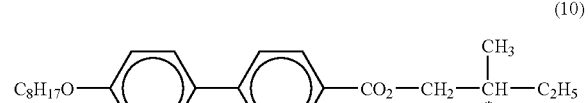

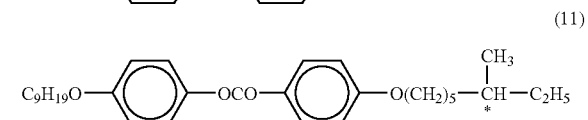

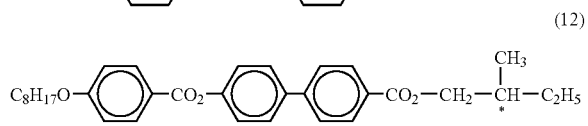

As mentioned herein, the solubility-modified high strength and/or high-toughness polymeric materials may be surface-modified to be soluble or at least more soluble in aqueous conditions by any chemical, physical, and/or mechanical means. One chemical modification may be exposure to a sulfuric acid solution to sulfonate the resins. A physical modification may be to expose the polymer to radiation to create surface hydroxyl moieties, and the like. Mechanical methods such as ball mills may surface modify the resins. Any combination of chemical, physical and mechanical methods may be employed as desired or as available. These techniques and there effects are well-known to skilled polymer artisans and require no further discussion herein.

Thermal properties that are of primary concern for solubility-modified high strength and/or high-toughness polymeric materials useful in the invention are the typical glass transition temperature, $T_g$, the typical melting temperature for the crystalline phase, $T_m$, and the flow characteristics at various melt processing temperatures. In certain embodiments $T_g$ may be above about 100° C., and may be above 130° C., while $T_m$ may be above 150° C., and may be above 200° C. or above 300° C. in some embodiments. For example, the properties of one commercially available PEEK includes a relatively high glass transition temperature of about 144° C., and a very high crystallized melting point of about 341° C. The bulk mechanical properties of solubility-modified high strength and/or high-toughness polymeric materials useful in the invention, including tensile and flexure properties at room temperature and elevated temperatures, impact strength, and the like, depend on the end use conditions. The microstructure of PEEK is strongly dependent upon the crystalline morphology and content. The degree of functionalization of these polymers may also boost the mechanical properties of these polymers. For example sulfonation of PEEK can lead to additional strength due to additional formation of ionic bonds.

The solubility-modified high strength and/or high-toughness polymer may be present with other non-modified polymers, as long as these other polymers do not compromise the invention. Suitable other polymeric materials for the first composition include natural polymers, synthetic polymers, blends of natural and synthetic polymers, and layered versions of polymers, wherein individual layers may be the same or different in composition and thickness. The term "polymeric material" includes composite polymeric materials, such as, but not limited to, polymeric materials having fillers, plasticizers, and fibers therein. Suitable synthetic polymeric materials include those selected from thermoset polymers and non-thermoset polymers. Examples of suitable non-thermoset polymers include thermoplastic polymers, such as polyolefins, halogenated polymers such as polytetrafluoroethylene and polychlorotrifluoroethylene, and thermoplastic elastomers. The term "polymeric material" includes composite polymeric materials, such as, but not limited to, polymeric materials having fillers, plasticizers, and fibers therein. It is well understood that due to intermolecular bonds within a thermoset this material does not dissolve in contact with well fluids instead it may swell. However upon exposure to certain chemicals the crosslinks may break.

One class of useful materials are the elastomers. "Elastomer" as used herein is a generic term for substances emulating natural rubber in that they stretch under tension, have a high tensile strength, retract rapidly, and substantially recover their original dimensions. The term includes natural and manmade elastomers, and the elastomer may be a thermoplastic elastomer or a non-thermoplastic elastomer. The term includes blends (physical mixtures) of elastomers, as well as copolymers, terpolymers, and multi-polymers. Useful elastomers may also include one or more additives, fillers, plasticizers, and the like.

Suitable examples of useable fluoroelastomers are copolymers of vinylidene fluoride and hexafluoropropylene and terpolymers of vinylidene fluoride, hexafluoropropylene and tetrafluoroethylene. The fluoroelastomers suitable for use in the disclosed invention are elastomers that comprise one or more vinylidene fluoride units ($VF_2$ or VdF), one or more hexafluoropropylene units (HFP), one or more tetrafluoroethylene units (TFE), one or more chlorotrifluoroethylene (CTFE) units, and/or one or more perfluoro(alkyl vinyl ether) units (PAVE) such as perfluoro(methyl vinyl ether)(PMVE), perfluoro(ethyl vinyl ether)(PEVE), and perfluoro(propyl vinyl ether)(PPVE). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units, such as the vinylidene fluoride type fluoroelastomers known under the trade designation Aflas®, available from Asahi Glass Co., Ltd. The elastomers known under the trade designation Aflas® are vinylidene fluoride type fluoroelastomers. Especially suitable are copolymers of vinylidene fluoride and hexafluoropropylene units. If the fluoropolymers contain vinylidene fluoride units, preferably the polymers contain up to 40 mole percent $VF_2$ units, e.g., 30-40 mole percent. If the fluoropolymers contain hexafluoropropylene units, preferably the polymers contain up to 70 mole percent HFP units. If the fluoropolymers contain tetrafluoroethylene units, preferably the polymers contain up to 10 mole percent TFE units. When the fluoropolymers contain chlorotrifluoroethylene preferably the polymers contain up to 10 mole percent CTFE units. When the fluoropolymers contain perfluoro(methyl vinyl ether) units, preferably the polymers contain up to 5 mole percent PMVE units. When the fluoropolymers contain perfluoro(ethyl vinyl ether) units, preferably the polymers contain up to 5 mole percent PEVE units. When the fluoropolymers contain perfluoro(propyl vinyl ether) units, preferably the polymers contain up to 5 mole percent PPVE units. The fluoropolymers preferably contain 66 percent-70 percent fluorine. One suitable commercially available fluoroelastomer is that known under the trade designation Technoflon FOR HS® sold by Ausimont USA. This material contains Bisphenol AF, manufactured by Halocarbon Products Corp. Another commercially available fluoroelastomer is known under the trade designation Viton® AL 200, by DuPont Dow, which is a terpolymer of $VF_2$, HFP, and TFE monomers containing 67 percent fluorine. Another suitable commercially available fluoroelastomer is Viton® AL 300, by DuPont Dow. A blend of the terpolymers known under the trade designations Viton® AL 300 and Viton® AL 600 can also be used (e.g., one-third AL-600 and two-thirds AL-300).

Thermoplastic elastomers are generally the reaction product of a low equivalent molecular weight polyfunctional monomer and a high equivalent molecular weight polyfunctional monomer, wherein the low equivalent weight polyfunctional monomer is capable, on polymerization, of forming a hard segment (and, in conjunction with other hard segments, crystalline hard regions or domains) and the high equivalent weight polyfunctional monomer is capable, on polymerization, of producing soft, flexible chains connecting the hard regions or domains. Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers. Upon crosslinking the elastomers are not expected to dissolve in presence of downhole fluids however they may swell or degrade.

"Segmented thermoplastic elastomer", as used herein, refers to the sub-class of thermoplastic elastomers which are based on polymers which are the reaction product of a high equivalent weight polyfunctional monomer and a low equivalent weight polyfunctional monomer.

"Ionomeric thermoplastic elastomers" refers to a sub-class of thermoplastic elastomers based on ionic polymers (ionomers). Ionomeric thermoplastic elastomers are composed of two or more flexible polymeric chains bound together at a plurality of positions by ionic associations or clusters. The ionomers are typically prepared by copolymerization of a functionalized monomer with an olefinic unsaturated monomer, or direct functionalization of a preformed polymer. Carboxyl-functionalized ionomers are obtained by direct copolymerization of acrylic or methacrylic acid with ethylene, styrene and similar comonomers by free-radical copolymerization. The resulting copolymer is generally available as the free acid, which can be neutralized to the degree desired with metal hydroxides, metal acetates, and similar salts.

Another useful class of polymeric materials for use as the other polymer are thermoplastic materials. A thermoplastic material is defined as a polymeric material (preferably, an organic polymeric material) that softens and melts when exposed to elevated temperatures and generally returns to its original condition, i.e., its original physical state, when cooled to ambient temperatures. During the manufacturing process of a well operating element, the thermoplastic material may be heated above its softening temperature, and preferably above its melting temperature, to cause it to flow and form the desired shape of the first component. After the desired shape is formed, the thermoplastic substrate is cooled and solidified. In this way, thermoplastic materials (including thermoplastic elastomers) can be molded into various shapes and sizes.

Thermoplastic materials may be preferred over other types of polymeric materials for the other polymer at least because the product has advantageous properties, and the manufacturing process for the preparation of well operating elements may be more efficient. For example, an oilfield element formed from a thermoplastic material is generally less brittle than an element formed from a thermosetting material. Furthermore, as compared to a process that would use a thermosetting resin, a process that uses a thermoplastic material may require fewer processing steps, fewer organic solvents, and fewer materials, e.g., catalysts. Also, with a thermoplastic material, standard molding techniques such as injection molding can be used. This can reduce the amount of materials wasted in construction.

Moldable thermoplastic materials that may be used are those having a high melting temperature, good heat resistant properties, and good toughness properties such that the oilfield element or assemblies containing these materials operably withstand oilfield conditions without substantially deforming or disintegrating. The toughness of the thermoplastic material may be measured by impact strength. Preferably, the thermoplastic material has a Gardner Impact value of at least about 0.4 Joules for a 0.89 mm thick sample under ambient conditions. More preferably, the "tough" thermoplastic materials that may be used in the oilfield elements of the present invention may have a Gardner Impact value of at least about 0.9 Joules, and most preferably at least about 1.6 Joules, for a 0.89 mm thick sample under ambient conditions.

Examples of thermoplastic materials suitable for use as the other polymer according to the present invention include polycarbonates, polyetherimides, polyesters, polysulfones, polystyrenes, acrylonitrile-butadiene-styrene block copolymers, acetal polymers, polyamides, or combinations thereof. Of this list, polyamides and polyesters may provide better performance. Polyamide materials are useful at least because they are inherently tough and heat resistant, typically provide good adhesion to coatings without priming, and are relatively inexpensive. Various types of polyamide resin materials, such as nylons, may be used, such as nylon 6/6 or nylon 6. Nylon 6/6 is a condensation product of adipic acid and hexamethylenediamine. Nylon 6/6 has a melting point of about 264° C. and a tensile strength of about 770 kg/cm$^2$. Nylon 6 is a polymer of $\epsilon$-caprolactam. Nylon 6 has a melting point of about 223° C. and a tensile strength of about 700 kg/cm$^2$. Examples of commercially available nylon resins include those known under the trade designations "Vydyne" from Solutia, St. Louis, Mo.; "Zytel" and "Minlon" both from DuPont, Wilmington, Del.; "Trogamid T" from Degussa Corporation, Parsippany, N.J.; "Capron" from BASF, Florham Park, N.J.; "Nydur" from Mobay, Inc., Pittsburgh, Pa.; and "Ultramid" from BASF Corp., Parsippany, N.J. Mineral-filled thermoplastic materials can be used, such as the mineral-filled nylon 6 resin "Minlon", from DuPont.

Suitable thermoset (thermally cured) polymers for use as other polymers in the present invention include those known in the thermoset molding art. Thermoset molding compositions are generally thermosetting resins containing inorganic fillers and/or fibers. Upon heating, thermoset monomers initially exhibit viscosities low enough to allow for melt processing and molding of an article from the filled monomer composition. Upon further heating, the thermosetting monomers react and cure to form hard resins with high stiffness. Thermoset polymeric substrates useful in the invention may be manufactured by any method known in the art. These methods include, but are not limited to, reaction injection molding, resin transfer molding, and other processes wherein dry fiber reinforcement plys (preforms) are loaded in a mold cavity whose surfaces define the ultimate configuration of the article to be fabricated, whereupon a flowable resin is injected, or vacuumed, under pressure into the mold cavity (mold plenum) thereby to produce the article, or to saturate/wet the fiber reinforcement preforms, where provided. After the resonated preforms are cured in the mold plenum, the finished article is removed from the mold. As one non-limiting example of a useable thermosettable polymer precursor composition, U.S. Pat. No. 6,878,782 discloses a curable composition including a functionalized poly(arylene ether); an alkenyl aromatic monomer; an acryloyl monomer; and a polymeric additive having a glass transition temperature less than or equal to 100° C., and a Young's modulus less than or equal to 1000 megapascals at 25° C. The polymeric additive is soluble in the combined functionalized poly(arylene ether), alkenyl aromatic monomer, and acryloyl monomer at a temperature less than or equal to 50° C. The composition exhibits low shrinkage on curing and improved surface smoothness. It is useful, for example, in the manufacture of sucker rods.

Materials susceptible to attack by strongly acidic compositions may be useful materials in the polymer composition, as long as they can be used in the well environment for at least the time required to perform their intended function, for example, divert fracturing fluids. Ionomers, polyamides, and polycarbonates, for example, may be attacked by strong oxidizing acids, but are relatively inert to weak acids. Depending on the chemical composition and shape of the solubility-modified high strength and/or high-toughness polymeric materials useful in the invention, its thickness, the temperature in the wellbore, and the composition of the well and injected fluids, including the pH, the rate of decomposition of the solubility-modified high strength and/or high-toughness polymeric materials may be controlled.

It may be possible to tailor the rate of dissolution of the soluble polymer by incorporation of swellable polymers such as super absorbent polymers. Table 1 compares the effect of addition of a swellable polymer versus a soluble polymer and in this example gives the effect of addition of superabsorbant polymers on the solubility of polylactic acid (PLA) polymer. A similar effect is expected for high strength and/or high-toughness soluble polymers. Another way to tailor the solubility is by controlling the degree of functionalization of the base polymer. For example treating PEEK with concentrated sulfuric acid for different times gives sulfonated PEEK having different rates of dissolution. Table 2 gives data on sulfonation conditions and rate of dissolution and the effect of degree of sulfonation on PEEK solubility has been well documented in the literature. Table 3 compares the strength, strain at failure and strain energy per unit volume for sulfonated PEEK grade S5H with two grades of polylactic acid (3051D and 4060D respectively). It is clear that S5H grade has about 600% higher strain energy per unit volume at room temperature compared to the two PLA grades. Although the tensile strength of the two PLA grades 3051D and 4060D are higher than S5H grade at room temperature it should be noted that the two PLA grades have very low rate of dissolution compared to S5H grade. It is clear that S5H grade overcomes the slow degradation rate limitation of PLA without sacrificing much of the tensile strength. At 200° F. (93° C.) S5H has in fact higher tensile strength than PLA 4060D and only 50% lower strength than PLA 3051D and unlike PLA completely dissolves in water at 200° F. (93° C.).

FIGS. 1-9 illustrate several non-limiting oilfield elements of the invention. FIGS. 1A, 1B, and 1C illustrate schematic cross-sectional views of three well operating element embodiments 10, 20, and 30, respectively designed for deployment in a wellbore within a geological formation. Embodiment 10 is a ball-shaped well operating element having a first substantially non-water soluble component 12 and a second, relatively water-soluble component 14, with a single exposure hole 16 adapted to expose component 14 to well bore fluid. Exposure hole 16 is illustrated exaggerated in length and diameter for purposes of illustration. Embodiment 20 is an elongated ball-shaped element, also having a first component 12 and a second component 14, with three exposure holes 16 adapted to expose component 14 to well bore fluid. Three exposure holes 16 are illustrated, with two of the holes having shorter length than a third hole. Elongated ball 20 has first and second ends hemispherical ends 15 and 17, respectively, and a cylindrical middle section 18. Embodiment 30 is a dart embodiment, again having first component 12 and second component 14, with five exposure holes 16 of varying length. Embodiment 30 has a hemispherical section 32 that would be the first end in the wellbore, and a conical section 34. Sections 32 and 34 are joined at a junction 36 which may vary in diameter. In each of embodiments 10, 20, and 30, exposure holes 16 could be tortuous holes, and are illustrated as straight for convenience only.

Figure 2:
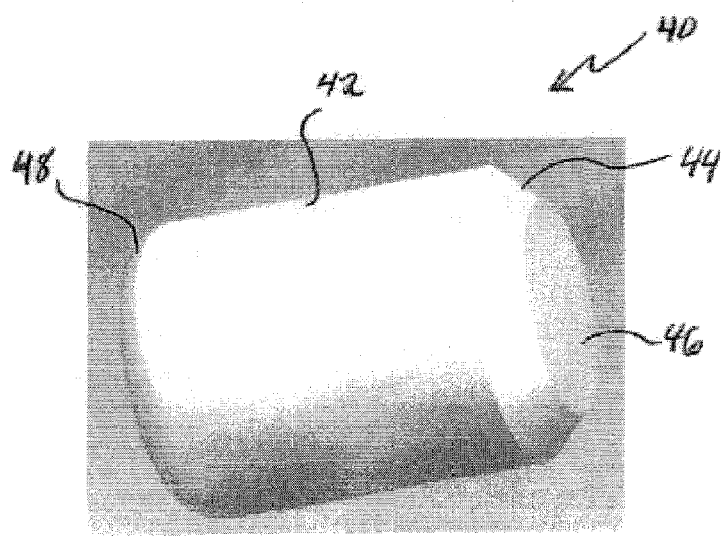

FIG. 2 illustrates a schematic perspective view of another well operating element embodiment 40 of the invention. Embodiment 40 includes a cylindrical section 42, a short conical section 44, and a flat lead end 46 (end which would be first when flowed in a well bore), and a rear end 48, curved to provide a streamlined flow. Illustrated is only the first (relatively water-insoluble) component; the second, relatively water-soluble component is almost entirely covered by the first component, save for one or more exposure holes that may be positioned in rear end 48, and are not illustrated in FIG. 2.

Figure 3:
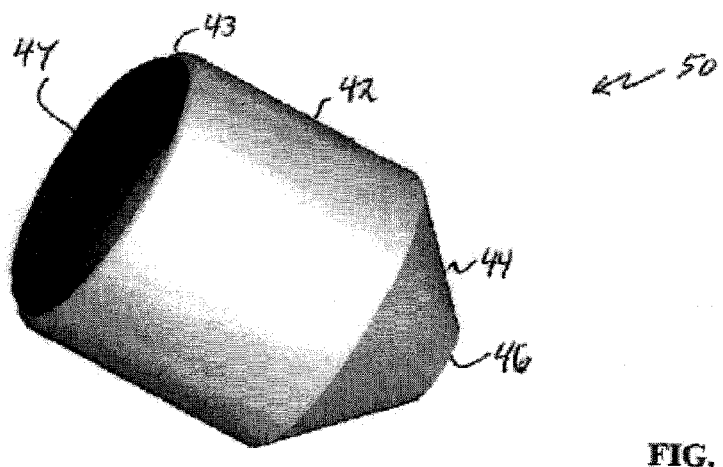

FIG. 3 illustrates a schematic perspective view of another well operating element embodiment 50 of the invention. Embodiment 50 includes a cylindrical section 42, a conical section 44, and a flat lead end 46 (end which would be first when flowed in a well bore). Cylindrical section 42 has, in this embodiment, an end 47, which may be as illustrated, or may be closer to conical section 44 if desired depending on the degree of exposure desired for second component 47. Exposed second component 47 and end 43 may be streamlined as illustrated.

Figure 4A:
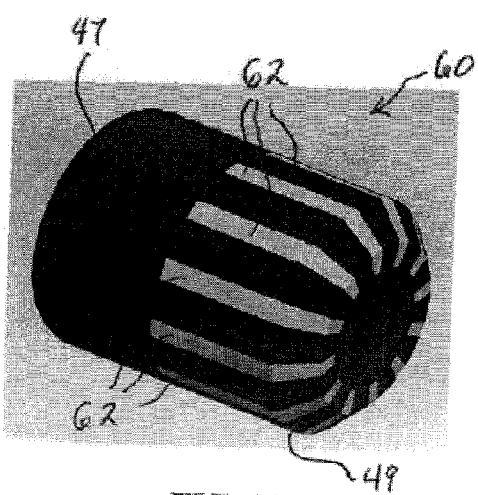
Figure 4B:
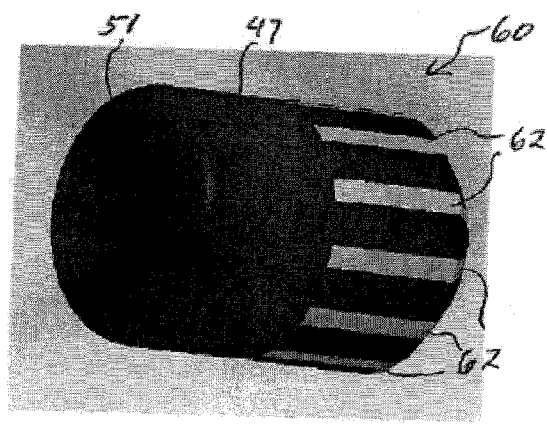

FIGS. 4A and 4B illustrate two schematic perspective views of another well operating element embodiment 60 of the invention. FIG. 4A illustrates generally a forward port perspective view, while FIG. 4B is an aft port view, using marine terminology. In embodiment 60, the overall shape of the well operating element is similar to embodiment 40 of FIG. 2, although this is not required. Embodiment 60 includes a large, exposed relatively water-soluble component 47, 49, and 51 covered in certain front and side locations by strips 62 of relatively insoluble component material, which may be the same or different from strip to strip.

FIGS. 5A and 5B illustrate two schematic perspective views of another well operating element embodiment 70 of the invention. These figures illustrate a collet 72 of first, relatively insoluble component having a plurality of supports arms 74 extending therefrom, which serve to support and hold portions 76 of second, relatively water-soluble component 47 in place until they are dissolved. Embodiment 70 may also include one or more exposure holes 16 in the second component, although this is optional.

FIG. 6 is a perspective view of another well operating element embodiment 80 of the invention, which is similar to embodiment 50 of FIG. 3, except that more of the second relatively water-soluble component 47 is exposed, illustrating one of many mechanisms of controlling the dissolvability of the second material. First component 44 and 46 may be a hollow cap, or it may be placed directly in contact with second component. In other words, second component 47 may have a conical section and flat end corresponding substantially with conical section 44 and flat end 46 of the first component.

Figure 7A:
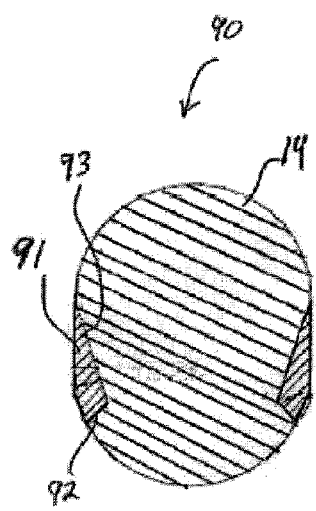
Figure 7B:
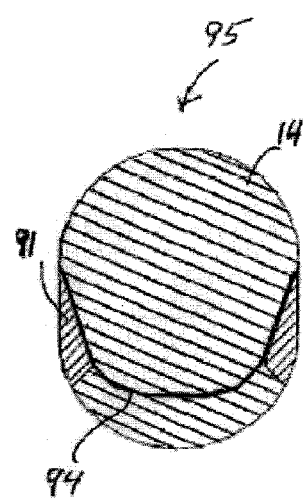
Figure 8:
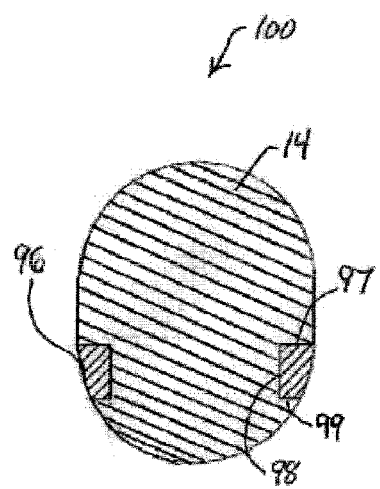

FIGS. 7A, 7B, and 8 illustrate cross-sectional views of three more embodiments 90, 95, and 100, respectively, of well operating elements of the invention, all three embodiments being elongated balls, but these embodiments are merely exemplary. Embodiment 90 of FIG. 7A illustrates are large portion 14 of second component, and an embedded, conical first component 91 having interfaces 92 and 93 with second component 14. This arrangement of first and second components affords another mechanical mechanism to control the dissolvability of the second component. Embodiment 95 of FIG. 7B adds a layer of fabric material 94, such as that known under the trade designation Kevlar, available from Dupont, Wilmington, Del., for adding structural integrity. Embodiment 100 of FIG. 8 illustrates an embodiment wherein a flat washer-like piece of first component 96 is used to restrict the dissolvability of second component 14. Interfaces 97, 98, and 99 afford structural stability and contact between first component 96 and second component 14. A layer of material, such layer 94 in FIG. 7B, may be used in this embodiment as well.

Figure 9:
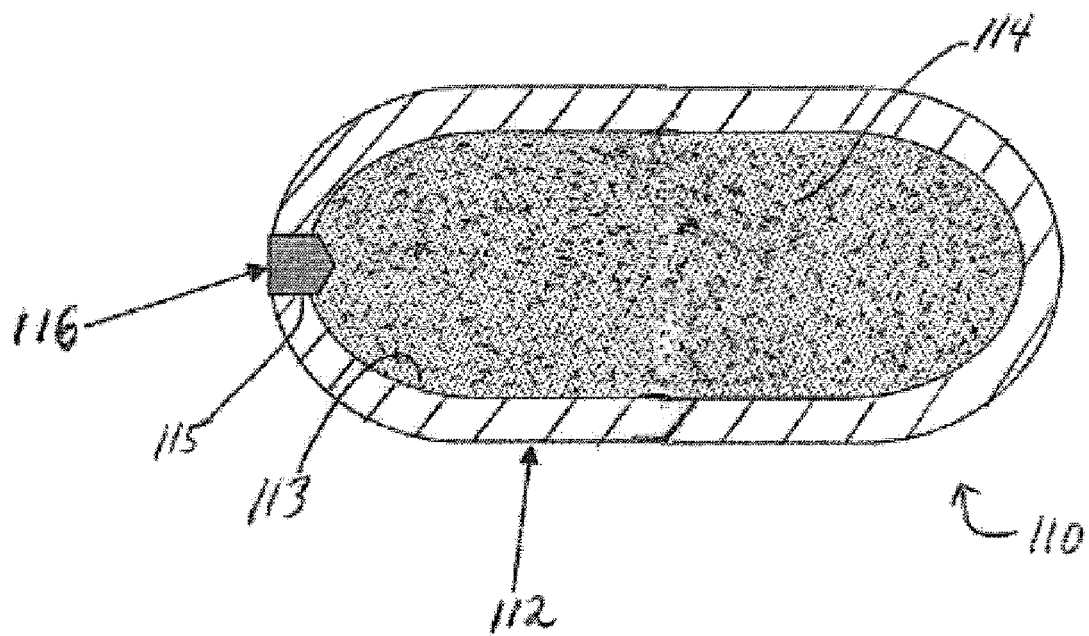

Other embodiments of the invention are apparatus which have a rapid and spontaneous corrosive reaction triggered by contact with well fluids. FIG. 9 illustrates schematically one embodiment 110 of this concept. Apparatus 110, which may be an oilfield element, comprises an outer shell-like member 112 defining an internal cavity 113. Outer member 112 may comprise a metal, for example aluminum. Internal cavity 113 may be filled with a material 114 that is reactive with the outer shell in aqueous conditions but that does not react with the outer shell-like member under non-aqueous conditions. For example, material 114 may comprise solid anhydrous sodium hydroxide pellets or powder, or commercially available soda ash. Outer shell-like member 112 may have one or more small holes 115 which may be plugged with a one way valve 116 after filling cavity 113 with soda ash 114. Plugged hole 115 allows the flow of fluid into cavity 113 once valve 116 opens due to applied fracturing pressure, as one example. Alternately, hole 115 may be plugged with a dissolvable material which dissolves when contacted with well fluid. The thickness of the dissolvable material may be such that the dissolvable material sufficiently dissolves and unplugs hole 115, for example after about 2 to 4 hrs after coming in contact with well fluid. Once the dissolvable material solubilizes in well fluid, the hole is opened, allowing the well fluid to enter the cavity and contact the soda ash. In the presence of water soda ash reacts with aluminum and rapidly corrodes the metal shell and dissolves it. In the absence of water, soda ash does not react with aluminum and allows the ball to act as a seal.

Oilfield elements of the invention may include many optional items. One optional feature may be one or more sensors located in the first or second component to detect the presence of hydrocarbons (or other chemicals of interest) in the zone of interest. The chemical indicator may communicate its signal to the surface over a fiber optic line, wire line, wireless transmission, and the like. When a certain chemical or hydrocarbon is detected that would present a safety hazard or possibly damage a downhole tool if allowed to reach the tool, the element may act or be commanded to close a valve before the chemical creates a problem.

In summary, generally, this invention pertains primarily to oilfield elements, such as well operating elements, comprising a first component and a second component as described herein, and optionally a protective coating, which may be conformal, on the outside surface of the either or both components. One useful protective coating embodiment is a Parylene coating. Parylene forms an almost imperceptible plastic conformal coating that protects materials from many types of environmental problems. Any process and monomer (or combination of monomers, or pre-polymer or polymer particulate or solution) that forms a polymeric coating may be used. Examples of other methods include spraying processes (e.g. electrospraying of reactive monomers, or non-reactive resins); sublimation and condensation; and fluidized-bed coating, wherein, a single powder or mixture of powders which react when heated may be coated onto a heated substrate, and the powder may be a thermoplastic resin or a thermoset resin.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

TABLE 1

Effect of addition on swellable polymer on disintegration of soluble polymer part Solubility of Polylactic Acid Blends

| SAMPLE # | DESCRIPTION | PRE TEST WEIGHT - gm | POST TEST WEIGHT - gm | Change in weight | TEST PARAMETERS |
|---|---|---|---|---|---|
| 1 | Neat PLA grade 3051D | 3.50 | 3.55 | 0.05 | 1) SPECIMENS ARE WEIGHED BEFORE AND AFTER TEST. |
| 2 | 20% PLA 80% PVA | 3.51 | 5.52 | 2.01 | 2) SPECIMENS ARE PLACED IN ~500 ml OF WATER AT 180° F. |
| 3 | 40% PLA 60% PVA | 3.96 | 5.83 | 1.87 | 3) SPECIMENS ARE INSPECTED INITIALLY AT 5 MINUTE INCREMENTS. |
| 4 | 60% PAL 40% PVA | 3.20 | 4.45 | 1.25 | 4) AFTER 30 MINUTES THE SPECIMENS ARE INSPECTED EVERY 10 MINS. |
| 5 | 80% PLA 20% PVA | 3.46 | 3.48 | 0.02 | 5) CONTINUE UNTIL SPECIMENS ARE DISSOLVED OR THERE ARE NO CHANGES. |
| 6 | 20% PLA 80% SAP* | 5.65 | X | Substantially Disintegrated in 25 MIN | |
| 7 | 40% PLA 60% SAP* | 6.22 | X | Substantially Disintegrated in 20 MIN | * The SAP (superabsorbant polymer) is sodium Polyacrylate |
| 8 | 60% PLA 40% SAP* | 5.53 | X | Substantially Disintegrated in 20 MIN | BASF grade Hysorb 8400 with free swell capacity of 401 g/g in distilled water |
| 9 | 80% PLA 20% SAP* | 4.78 | X | Substantially Disintegrated in 100 MIN | PLA used in this experiment is 3051D grade from Nature Works |

TABLE 2

Effect of Degree of Sulfonation on Tailoring the PEEK Solubility

| Symbol | Sulfonation Time (Hours) | Swelling in deionized water g/g | | | | | | Dry Residue (%) |
|---|---|---|---|---|---|---|---|---|
| | | 25° | 60° | 80° | 90° | 105° | 115° | |
| D | 72 | 0.03 | 0.05 | 0.07 | 0.09 | 0.11 | 0.38 | 86.2 |
| L | 78 | 0.11 | 0.08 | 0.25 | 0.31 | 0.35 | 0.77 | 79.0 |
| K | 84 | 0.09 | 0.12 | 0.19 | 0.34 | 0.41 | 1.25 | 77.9 |
| J | 96 | 0.10 | 0.11 | 0.28 | 11.92 | 26.05 | 26.45 | 46.7 |
| I | 120 | 0.11 | 0.11 | 1.78 | 12.24 | 24.41 | 28.99 | 34.2 |
| F | 132 | 0.12 | 0.17 | 3.14 | 19.76 | ∞ | ∞ | 17.6 |
| E | 144 | 0.13 | 0.16 | 14.79 | ∞ | ∞ | dissolved | 0.0 |
| G | 156 | 0.15 | 0.17 | 43.06 | ∞ | ∞ | dissolved | 0.0 |
| H | 168 | 0.17 | 0.32 | dissolved | dissoved | dissolved | dissolved | 0.0 |
| S5H | 120 | 0.13 | 0.14 | 1.78 | 19.41 | ∞ | ∞ | 38.3 |
| S5Na | 120 | 0.23 | 0.29 | 0.90 | 27.21 | ∞ | ∞ | 25.8 |

Dry Residue - gel collected on a mesh #20 after the 115° C. swelling, and dried at 90° C. overnight (the smaller the fraction of the initial weight, the more soluble the SPEEK is)
Swelling - from 0.0 to ca. 2.0 = weakly to moderately swollen films, very strong mechanically from 2.0 to ca. 10.0 = higly swollen, mechanically weak films (gels) from 10 to ca. 50 = very highly swollen, mechanically very weak gels

TABLE 3

Comparison of Sulfonated PEEK ("SPEEK") with PLA

| Material Grade | Temp F. | Stress psi | Strain % | Strain Energy/volume psi |
|---|---|---|---|---|
| SPEEK S5H vacuum dried | 70 | 4125 | 70 | 3100 |
| PLA 3051D | 70 | 10231 | 5.4 | 458 |
| PLA 4060D | 70 | 9240 | 7.5 | 558 |
| SPEEK S5H vacuum dried | 200 | 338 | 173 | |
| PLA 3051D | 200 | 744 | NA | NA |
| PLA 4060D | 200 | 14.21 | NA | NA |

What is claimed is:

1. An oilfield element for engaging a seat within a wellbore and provide a fluid barrier therewith, the oilfield element comprising:
    a body of the oilfield element having a shape to facilitate travel through a wellbore;
    a core portion of the body;
    a shell portion of the body disposed about the core portion and having a shape that cooperates with the seat to provide a fluid barrier within the wellbore;
    a non-soluble component of the shell portion which provides a structural integrity of the shell portion;
    an opening of the shell portion providing fluid access to the core portion; and
    a soluble component of the core portion which degrades when exposed to wellbore fluids thereby reducing the structural integrity of the shell portion and compromising the fluid barrier provided by the cooperation of the shell portion and the seat.

2. The oilfield element of claim 1 wherein the non-soluble component and soluble component are selected such that the degradation of the soluble component of the core portion provides an environment which degrades the non-soluble component of the shell.

3. The oilfield, element of claim 1 wherein the non-soluble component includes aluminum.

4. The oilfield element of claim 1 including a plug in the opening of the shell portion to temporarily block wellbore fluid from contacting and degrading the soluble component of the core portion.

5. The oilfield element of claim 1 wherein the non-soluble component comprises a metal selected the group consisting of iron, copper, titanium, zirconium, and combinations thereof.

6. The oilfield element of claim 1 wherein the opening comprises a plurality of holes extending through the non-soluble component into the soluble component, the number of holes controlling degradation of the soluble component.

7. The oilfield element of claim 1, wherein the oilfield element has a shape selected from the group consisting of cylindrical, round, bar shapes, and dart shapes.

* * * * *